(12) United States Patent
Atashbar et al.

(10) Patent No.: US 10,746,612 B2
(45) Date of Patent: Aug. 18, 2020

(54) METAL-METAL COMPOSITE INK AND METHODS FOR FORMING CONDUCTIVE PATTERNS

(71) Applicant: The Board of Trustees of Western Michigan University, Kalamazoo, MI (US)

(72) Inventors: Massood Atashbar, Portage, MI (US); Mohammed Mudher Mohammed Ali, Kalamazoo, MI (US); Binu Baby Narakathu, Kalamazoo, MI (US); Ali Eshkeiti, Kalamazoo, MI (US)

(73) Assignee: The Board of Trustees of Western Michigan University, Kalamazoo, MI (US)

(*) Notice: Subject to any disclaimer, the term of this patent is extended or adjusted under 35 U.S.C. 154(b) by 0 days.

(21) Appl. No.: 15/827,312

(22) Filed: Nov. 30, 2017

(65) Prior Publication Data
US 2018/0149531 A1 May 31, 2018

Related U.S. Application Data

(60) Provisional application No. 62/428,172, filed on Nov. 30, 2016.

(51) Int. Cl.
*G01L 1/00* (2006.01)
*G01L 1/22* (2006.01)

(52) U.S. Cl.
CPC .................. *G01L 1/2287* (2013.01)

(58) Field of Classification Search
CPC ...................................................... G01L 1/2287
USPC ........................................................... 73/774
See application file for complete search history.

(56) References Cited

U.S. PATENT DOCUMENTS

| 4,861,425 | A | 8/1989 | Greer et al. |
| 6,936,491 | B2 | 8/2005 | Partridge et al. |
| 7,352,040 | B2 | 4/2008 | Partridge et al. |
| 8,482,418 | B1 | 7/2013 | Harman |
| 9,051,176 | B2 | 6/2015 | Mason |
| 9,502,734 | B1 * | 11/2016 | Lim .................. H01M 10/0436 |

(Continued)

FOREIGN PATENT DOCUMENTS

| CN | 101149364 A | 3/2008 |
| DE | 1338423 A1 | 5/1994 |

(Continued)

OTHER PUBLICATIONS

S-H. Bae, Y. Lee, B. K. Sharma, H-J. Lee, J-H. Kim, J-H. Ahn, "Graphene-based Transparent Strain Sensor", Carbon, vol. 51, pp. 236-242, 2013.

(Continued)

*Primary Examiner* — Jamel E Williams
(74) *Attorney, Agent, or Firm* — Price Heneveld LLP

(57) ABSTRACT

A printed stretchable strain sensor is provided. The printed stretchable strain sensor has a stretchable substrate and a composite ink coupled to a surface of the stretchable substrate to form a strain-sensitive conductive structure. The composite ink includes both a nanowire and a metal flake. The capability of the fabricated strain sensor, printed in two design configurations: straight line and wavy line, was investigated by studying its electro-mechanical response towards varying elongations of 1 mm, 2 mm, and 3 mm.

20 Claims, 5 Drawing Sheets

(56) References Cited

U.S. PATENT DOCUMENTS

| | | | |
|---|---|---|---|
| 2004/0245586 | A1 | 12/2004 | Partridge et al. |
| 2005/0118733 | A1 | 6/2005 | Schmidt et al. |
| 2006/0132025 | A1 | 6/2006 | Gao et al. |
| 2006/0145860 | A1 | 7/2006 | Brown |
| 2007/0020445 | A1 | 1/2007 | Liu et al. |
| 2007/0259474 | A1 | 11/2007 | Shin et al. |
| 2009/0031561 | A1 | 2/2009 | Huang et al. |
| 2009/0196001 | A1 | 8/2009 | Sunohara et al. |
| 2009/0249621 | A1 | 10/2009 | Rochat et al. |
| 2010/0068467 | A1 | 3/2010 | Song et al. |
| 2010/0104678 | A1 | 4/2010 | Khandros et al. |
| 2010/0143848 | A1 | 6/2010 | Jain et al. |
| 2010/0270165 | A1 | 10/2010 | Cohen et al. |
| 2011/0203656 | A1 | 8/2011 | Kuang et al. |
| 2012/0256720 | A1 | 10/2012 | Byun et al. |
| 2013/0041334 | A1 | 2/2013 | Prioleau et al. |
| 2014/0090879 | A1 | 4/2014 | Seneviratne et al. |
| 2014/0263171 | A1 | 9/2014 | Frantz et al. |
| 2014/0299839 | A1 | 10/2014 | Shepard et al. |
| 2015/0202656 | A1* | 7/2015 | Takahashi ............ H01L 41/0986 310/300 |
| 2015/0235731 | A1* | 8/2015 | Park ........................ B82Y 30/00 252/514 |
| 2015/0342523 | A1* | 12/2015 | Baik ..................... A61B 5/6801 600/595 |
| 2016/0290880 | A1 | 10/2016 | Lewis et al. |
| 2016/0377493 | A1 | 12/2016 | Hong et al. |
| 2017/0016875 | A1 | 1/2017 | Parker et al. |
| 2007/0120444 | A1 | 5/2017 | Motoyoshi et al. |
| 2017/0169914 | A1* | 6/2017 | Sekitani ................... H01B 1/22 |
| 2017/0213648 | A1 | 7/2017 | Joyce et al. |
| 2018/0146545 | A1* | 5/2018 | Wang ...................... C08L 53/02 |

FOREIGN PATENT DOCUMENTS

| | | | |
|---|---|---|---|
| JP | 2007524995 | A | 8/2007 |
| JP | 2010140717 | A | 6/2010 |
| WO | 2004013922 | A2 | 2/2004 |
| WO | 2004096896 | A2 | 11/2004 |
| WO | 2004108585 | A2 | 12/2004 |
| WO | 2005065433 | A2 | 7/2005 |
| WO | 2006063934 | A2 | 6/2006 |
| WO | 2006113492 | A2 | 10/2006 |
| WO | 2006130558 | A2 | 12/2006 |
| WO | 2008018026 | A2 | 2/2008 |
| WO | 2009111641 | A1 | 9/2009 |
| WO | 2011115643 | A1 | 9/2011 |
| WO | 2015031073 | A1 | 3/2015 |
| WO | 2016019223 | A1 | 2/2016 |

OTHER PUBLICATIONS

J. Kim, K. Wubs, B-S. Bae, W. S. Kim, "Direct Stamping of Silver Nanoparticles toward Residue-free thick Electrode", Science and Technology of Advanced Materials, vol. 13, pp. 1-6, 2012.

S. Gong, W. Schwalb, Y. Wang, Y. Chen, Y. Tang, J. Si, B. Shirinzadeh, W. Cheng, "A Wearable and Highly Sensitive Pressure Sensor with Ultrathin Gold Nanowires", Nature Communications, vol. 5, Art. 3132, 2014.

Y. Yue, P. Liu, Z. Zhang, X. Han, E. Ma, "Approaching the Theoretical Elastic Strain Limit in Copper Nanowires", Nano Letters, vol. 11, No. 8, pp. 3151-3155, 2011.

C. Cochrane, V. Koncar, M. Lewandowski, C. Dufour, "Design and Development of a Flexible Strain Sensor for Textile Structures based on a Conductive Polymer Composite", Sensors, vol. 7, No. 4, pp. 473-492, 2007.

M. Park, J. Im, M. Shin, Y. Min, J. Park, H. Cho, S. Park, M.-B. Shim, S. Jeon, D.-Y. Chung, J. Bae, J. Park, U. Jeong, C. Kim, "Highly Stretchable Electric Circuits from a Composite Material of Silver Nanoparticles and Elastomeric Fibres", Nature Nanotechnology, vol. 7, pp. 803-809, 2012.

N. Hu, T. Itoi, T. Akagi, T. Kojima, J. Xue, C. Yan, S. Atobe, H. Fukunaga, W. Yuan, H. Ning, Surina, Y. Liu, Alamusi, "Ultrasensitive Strain Sensors made from Metal-Coated Carbon Nanofiller/Epoxy Composites", Carbon, vol. 51, pp. 202-212, 2013.

S. Yun, X. Niu, Z. Yu, W. Hu, P. Brochu, Q. Pei, "Compliant Silver Nanowire-Polymer Composite Electrodes for Bistable Large Strain Actuation", Advanced Materials, vol. 24, No. 10, pp. 1321-1327, 2012.

Y. Liu, D. Zhang, K. Wang, Y. Liu, Y. Shang, "A Novel Strain Sensor based on Graphene Composite Films with Layered Structure", Composites Part A: Applied Science and Manufacturing, vol. 80, pp. 95-103, 2016.

J. R. Bautista-Quijano, P. Potschke, H. Brunig, G. Heinrich, "Strain Sensing, Electrical and Mechanical Properties of Polycarbonate/Multiwall Carbon Nanotube Monofilament Fibers Fabricated by Melt Spinning", Polymer, vol. 82, pp. 181-189, 2016.

J. Hong, Z. Pan, Z. Wang, M. Yao, J. Chen, Y. Zhang, "A Large-Strain Weft-Knitted Sensor Fabricated by Conductive UHMWPE/PANI Composite Yarns", Sensors and Actuators A: Physical, vol. 238, pp. 307-316, 2016.

D. Son, J. Lee, S. Qiao, R. Ghaffari, J. Kim, J. E. Lee, C. Song, S. J. Kim, D. J. Lee, S. W. Jun, S. Yang, M. Park, J. Shin, K. Do, M. Lee, K. Kang, C. S. Hwang, N. Lu, T. Hyeon, D.-H. Kim, "Multifunctional Wearable Devices for Diagnosis and Therapy of Movement Disorders", Nature Nanotechnology, vol. 9, pp. 397-404, 2014.

D. Vilela, A. Romeo, S. Sánchez, "Flexible Sensors for Biomedical Technology", Lab on a Chip, vol. 16, pp. 402-408, 2016.

T. Q.Trung, N-E. Lee, "Flexible and Stretchable Physical Sensor Integrated Platforms for Wearable Human-Activity Monitoring and Personal Healthcare", Advanced Materials, 2016.

H. Subbaraman, Z. Pan, C. Zhang, Q. Li, L. J. Guo, R. T. Chen, "Printed Polymer Photonic Devices for Optical Interconnect Systems", SPIE Proceedings, Optical Interconnects, pp. 97530Y-1-97530Y-10, vol. 9753, 2016.

H. Yousef, M. Boukallel, K Althoefer, "Tactile Sensing for Dexterous In-hand Manipulation in Robotics: A Review", Sensors and Actuators A: physical, vol. 167, No. 2, pp. 171-187, 2011.

Z. Yu, L. L Li, Q. Zhang, W. Hu, Q. Pei, "Silver Nanowire-Polymer Composite Electrodes for Efficient Polymer Solar Cells", Advanced Materials, vol. 23, No. 38, pp. 4453-4457, 2011.

K. Alzoubi, M. M. Hamasha, S. Lu, B. Sammakia, "Bending Fatigue Study of Sputtered ITO on Flexible Substrate", Journal of Display Technology, vol. 7, No. 11, pp. 593-600, 2011.

S. Jampasa, W. Wonsawaf, N. Rodthongkum, W. Siangproh, P. Yanatatsaneejit, T. Vilaivan, O. Chailapakul, "Electrochemical Detection of Human Papillomavirus DNA type 16 using a Pyrrolidinyl Peptide Nucleic Acid Probe Immobilized on Screen-printed Carbon Electrodes", Biosensors Bioelectron, vol. 54, pp. 428-434, 2014.

X. Liu, M. Mwangi, X. Li, M. O'Brien, G. M. Whitesides, "Paper-based Piezoresistive MEMS Sensors", Lab on a Chip, vol. 11, No. 13, pp. 2189-2196, 2011.

P. H. Lau, K. Takei, C. Wang, Y. Ju, J. Kim, Z. Yu, T. Takahashi, G. Cho, A. Javey, "Fully Printed, High Performance Carbon Nanotube Thin-film Transistors on Flexible Substrates", Nano Letters, vol. 13, No. 8, pp. 3864-3869, 2013.

A. Eshkeiti, B. B. Narakathu, A. S. G. Reddy, A. Moorthi, M. Z. Atashbar, E. Rebrosova, M. Rebros, M. Joyce, "Detection of Heavy Metal Compounds using a Novel Inkjet Printed Surface enhanced Raman Spectroscopy (SERS) Substrate", Sensors and Actuators B: Chemical, vol. 171-172, pp. 705-711, 2012.

F. C. Krebs, J. Fyenbo, M. Jørgensen, "Product Integration of Compact Roll-to-Roll Processed Polymer Solar Cell Modules: Methods and Manufacture using Flexographic Printing, Slot-die Coating and Rotary Screen Printing", Journal of Materials Chemistry, vol. 20, No. 41, pp. 8994-9001, 2010.

Y. Wei, R. Torah, K. Yang, S. Beeby, J. Tudor, "Screen Printing of a Capacitive Cantilever Based Motion Sensor on Fabric using a Novel Sacrificial Layer Process for Smart Fabric Applications", Measurement Science and Technology, vol. 24, No. 7, pp. 075104, 2013.

H. Hocheng, C. M. Chen, "Design, Fabrication and Failure Analysis of Stretchable Electrical Routings", Sensors, vol. 14, pp. 11855-11877, 2014.

(56) References Cited

OTHER PUBLICATIONS

Y. Zhou, H. Han, H. P. P. Naw, A. V. Lammy, C. H. Goh, S. Boujday, T. W. J. Steele, "Real-time Colorimetric Hydration Sensor for Sport Activities", Materials & Design, vol. 90, pp. 1181-1185, 2016.

S. Gholinezhadasnefestani, A. Temko, N. Stevenson, G. Boylan, "Assessment of Quality of ECG for Accurate Estimation of Heart Rate Variability in Newborns", IEEE 66 37th International Conference on Engineering in Medicine and Biology Society, pp. 5863-5866, 2015.

J. Taelman, T. Adriaensen, C. Van der Horst, T. Linz, A. Spaepen, "Textile Integrated Contactless EMG Sensing for Stress Analysis", IEEE 29th Annual Conference on Engineering in Medicine and Biology Society, pp. 3966-3969, 2007.

A. Eshkeiti, Z. Ramshani, S. Emamian, B. B. Narakathu, "A Stretchable and Wearable Printed Sensor for Human Body Motion Monitoring", IEEE Sensors, pp. 1-4, 2015.

F. Xu, Y. Zhu, "Highly Conductive and Stretchable Silver Nanowire Conductors", Advanced Materials, vol. 24, No. 37, pp. 5117-5122, 2012.

S. Yao, Y. Zhu, "Wearable Multifunctional Sensors using Printed Stretchable Conductors made of Silver Nanowires", Nanoscale, vol. 6, No. 4, pp. 2345-2352, 2014.

E. Hrehorova, "Materials and Processes for Printed Electronics: Evaluation of Gravure Printing in Electronics Manufacture", PhD Dissertation, Western Michigan University, Paper 837, 2007.

M. J. Joyce, PhD., Flexographic Printing of Conductive Silver Inks onto PDMS: Surface Treatment and Novel Processes for Creating Printed Electronic Devices, Western Michigan University, 2016, pp. 147.

D. Zhou, H. Wang, "Design and evaluation of a skin-like sensor with high stretchability for contact pressure measurement," Sensors and Actuators A Physical 204, pp. 114-121, 2013.

\* cited by examiner

METAL-METAL COMPOSITE INK AND METHODS FOR FORMING CONDUCTIVE PATTERNS

CROSS-REFERENCE TO RELATED APPLICATIONS

This application claims priority under 35 U.S.C. 119(e) to U.S. Provisional Patent Application No. 62/428,172, filed Nov. 30, 2016, entitled "METAL-METAL COMPOSITE INK AND METHODS FOR FORMING CONDUCTIVE PATTERNS," which is herein incorporated by reference in its entirety.

FIELD OF THE INVENTION

The present disclosure generally relates to a device and method for a printed strain sensor on a stretchable substrate, and in particular, to a composite ink made from a nanowire and metal flake combination that improves the conductance values for a strain sensor.

BACKGROUND OF THE INVENTION

Over the past several years, strain sensors have been receiving an increased interest for applications such as human body movement tracking in the biomedical industry as well as for monitoring deformations or structural changes in civil infrastructural assets. Typically, strain sensors have been developed by depositing metal layers such as silver (Ag), gold (Au), and copper (Cu). However, these sensors are often fabricated on substrates that are not stretchable and are thus prone to mechanical failures due to their limited stretchable capabilities. Research in this area has led to the development of numerous metal-polymer composites for use in strain sensors such as silver nanoparticles/elastomeric fibers, metal coated carbon nanofiller/epoxy, and silver nanowire/polymer as well as polymer-polymer composites such as graphene composite films, polycarbonate/multiwall carbon nanotubes, and UHMWPE/PANI. The major drawback associated with these classes of sensors is the reduction in conductivity due to the use of polymeric materials.

BRIEF SUMMARY OF THE INVENTION

According to one aspect of the present disclosure, a printed stretchable strain sensor is provided. The printed stretchable strain sensor includes a stretchable substrate and a composite ink coupled to a surface of the stretchable substrate to form a strain-sensitive conductive structure, wherein the composite ink comprises a nanowire and a metal flake.

According to another aspect of the present disclosure, a method for printing a stretchable strain sensor is provided. The method includes mixing a nanowire together with a metal flake to form a composite ink, depositing the composite ink in a predetermined continuous configuration onto a surface of a stretchable substrate, and curing the composite ink to form a strain-sensitive conductive structure.

These and other features, advantages, and objects of the present invention will be further understood and appreciated by those skilled in the art by reference to the following specification, claims, and appended drawings.

DETAILED DESCRIPTION

Figure 1:
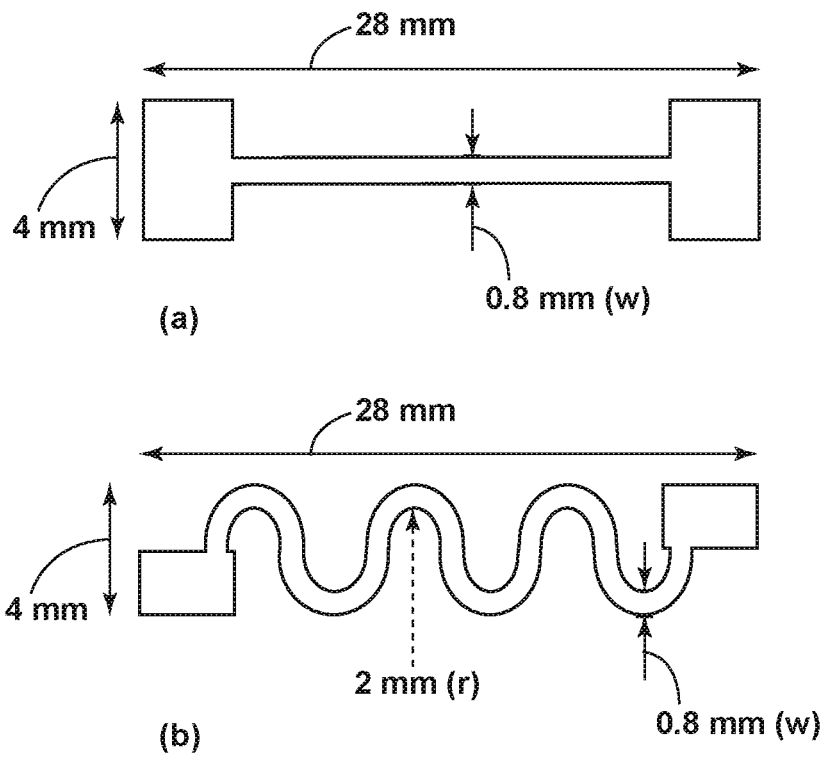
FIG. 1 is a schematic of a straight line and a wavy line for use as a strain-sensitive conductive structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Recent advancements in the field of printed electronics (PE) have demonstrated the development of flexible and stretchable electronic devices for applications in the biomedical, military and tactile robotic industries. The advantages associated with PE include additive manufacturing techniques, minimal usage of resources, and low manufacturing temperatures in comparison to silicon based technology, using photolithographic patterning techniques with high-vacuum and high-temperature deposition processes. PE devices such as solar cells, displays, electrochemical sensors, and piezo resistive sensors have been fabricated using traditional printing processes such as gravure, inkjet, flexography, and screen printing. Moreover, the flexible and stretchable capabilities, made possible by the use of flexible and stretchable substrates for PE, can help in the implementation of wearable electronic devices for monitoring temperature, hydration, electrocardiogram (ECG), electromyography (EMG), and human body movement. Wearable devices require flexible and stretchable electrodes that provide high conductivity and mechanical stability under varying strains. Therefore, the development of printed strain sensors on flexible and stretchable substrates is bound to have a significant impact in the field of wearable electronics.

A novel printed strain sensor, based on metal-metal composite ink, was successfully fabricated by screen printing a metal nanowire/metal flake composite ink on a flexible and stretchable substrate. The capability of the fabricated strain sensor, printed in two design configurations: straight line and wavy line, was investigated by studying its electromechanical response towards varying elongations of 1 mm, 2 mm, and 3 mm. For the printed sensor with the straight line configuration, average resistance changes of 104.88%, 177.30%, and 238.97%, over 100 cycles, were observed for the 1 mm, 2 mm, and 3 mm elongations, respectively. However, the printed sensor with the wavy line configuration demonstrated a dynamic range over 200 cycles with average resistance changes of 46.80%, 141.42%, and 243.66% for elongations of 1 mm, 2 mm, and 3 mm, respectively. In addition, the wavy line strain sensor showed an increased performance (33.27% change in resistance for every 1% strain), in terms of sensitivity, when compared to that of the straight line strain sensor (22.02% change in resistance for every 1% strain).

Referring to FIGS. 1-9, a printed stretchable strain sensor is provided. The printed stretchable strain sensor has a stretchable substrate and a composite ink coupled to a surface of the stretchable substrate to form a strain-sensitive conductive structure. The composite ink includes both a nanowire and a metal flake.

The composite ink may be coupled to the stretchable substrate using a variety of printing methodologies. For example, in some embodiments, a screen printing process may be used to transfer and couple the composite ink to the stretchable substrate. The screen printing process may use a stencil and/or a mesh to couple the composite ink.

The nanowire or metal nanowire used in the composite ink may include silver nanowire, gold nanowire, copper nanowire, nickel nanowire, platinum nanowire, carbon nanowire, aluminum nanowire, or combinations thereof. The metal flake used in the composite ink may include silver flake, gold flake, copper flake, nickel flake, platinum flake, aluminum flake, or combinations thereof. The combination of nanowire and metal flake used together in the composite ink may include any one or more of the silver nanowire, gold nanowire, copper nanowire, nickel nanowire, platinum nanowire, carbon nanowire, and/or aluminum nanowire, with any one or more of the silver flake, gold flake, copper flake, nickel flake, platinum flake, and/or aluminum flake. In some embodiments, the silver nanowire may be combined with the silver flake, the gold nanowire may be combined with the gold flake, the copper nanowire may be combined with the copper flake, the nickel nanowire may be combined with the nickel flake, the platinum nanowire may be combined with the platinum flake, the aluminum nanowire may be combined with the aluminum flake, the gold nanowire may be combined with the silver flake, the copper nanowire may be combined with the silver flake, the carbon nanowire may be combined with the silver flake, or the aluminum nanowire may be combined with the silver flake.

In some embodiments, the amount of nanowire combined with the metal flake has a nanowire weight percent from about 0.1% to about 10.0%, from about 0.1% to about 5.0%, from about 0.1% to about 1.0%, from about 0.1% to about 0.5%. In other embodiments, the amount of nanowire combined with the metal flake has a nanowire weight percent of about 0.5%, about 0.8%, about 0.13%, about 0.15%, about 0.18%, about 0.20%, or about 0.25%.

The stretchable substrate may include materials made from silicone, polyurethane, polybutadiene, neoprene, polydimethylsiloxane, silicone rubbers, or combinations thereof. The stretchable substrate selected for printing may be selected based on the desired properties of the final printed stretchable substrate and is not meant to be limiting. The corresponding strain-sensitive conductive structure printed on these stretchable substrates give printed stretchable strain sensors that may have a maximum strain of up to 50%, up to 40%, up to 30%, up to 20%, or up to 10%. In some embodiments, the printed stretchable strain sensor has a maximum strain of up to 50%.

The composite ink may be coupled to the surface of the stretchable substrate in a variety of different configurations. Although the configuration of the composite ink disclosed herein used to form the strain-sensitive conductive structure is not meant to be limiting, certain trends can be observed by comparing both a straight line configuration and a wavy line configuration. In some embodiments, the composite ink is coupled to the surface of the stretchable substrate to form the strain-sensitive conductive structure in a straight line configuration. The straight line configuration may have a sensitivity of about 20.0% to 25.0% in resistance change for every 1% of strain. For the straight line configuration, average resistance changes of about 105%, about 175%, and about 240%, over 100 cycles, were observed for the 1 mm, 2 mm, and 3 mm elongations, respectively. In some embodiments, average resistance changes of about 105%, about 175%, and about 240%, over 100 and/or 200 cycles, can be obtained for about 5% (±2%), 10% (±2%), and 15% (±2%), elongations for the straight line configuration, respectively. In some embodiments, average resistance changes of about 90% to 120%, about 160% to 190%, and about 225% to 255%, over 100 and/or 200 cycles, can be obtained for about 5% (±2%), 10% (±2%), and 15% (±2%), elongations for the straight line configuration, respectively.

In other embodiments, the composite ink is coupled to the surface of the stretchable substrate to form the strain-sensitive conductive structure in a wavy line configuration. The wavy line configuration may have a sensitivity of about 30.0% to 35.0% in resistance change for every 1% of strain. However, the printed sensor having the wavy line configuration demonstrated a dynamic range over 200 cycles with average resistance changes of 45%, 140%, and 245% for elongations of 1 mm, 2 mm, and 3 mm, respectively. In some embodiments, average resistance changes of about 45%, about 140%, and about 245%, over 100 and/or 200 cycles, can be obtained for about 5% (±2%), 10% (±2%), and 15% (±2%), elongations for the wavy line configuration, respectively. In some embodiments, average resistance changes of about 30% to 60%, about 125% to 155%, and about 230% to 260%, over 100 and/or 200 cycles, can be obtained for about 3.5% (±2%), 7% (±2%), and 10% (±2%), elongations for the wavy line configuration, respectively.

In some embodiments, a metal-metal composite based strain-sensitive conductive structure was fabricated on a flexible and stretchable thermoplastic polyurethane (TPU) substrate. A silver nanowire (Ag NW)/Ag flake composite ink was screen printed on the TPU substrate as the metal-metal composite. Silver nanowire was chosen as a stretchable filler because of its ability to maintain electrical conductivity for tensile strains ranging from 16% to 50%. Silver flake was chosen due to its viscous nature (12 Pa·s) and good adhesion capabilities. In addition, both the silver nanowire and the silver flake materials are compatible with the screen printing process. The capability of the printed stretchable strain sensor was demonstrated by investigating the electromechanical response for elongations of 1 mm, 2 mm, and 3 mm for each of the straight and wavy line configurations.

Referring to FIGS. 1-9, a method of printing a stretchable strain sensor is provided. The method includes mixing a nanowire together with a metal flake to form a composite ink and depositing the composite ink in a predetermined continuous configuration onto a surface of a stretchable substrate. The method further includes curing the composite ink to form a strain-sensitive conductive structure.

The composite ink may be deposited on the stretchable substrate so it has a width of 0.1 mm to 2 mm, 0.2 mm to 1.8 mm, 0.5 mm to 1.5 mm, 0.6 mm to 1.2 mm, 0.5 mm, 0.6 mm, 0.7 mm, 0.8 mm, 0.9 mm, 1.0 mm, 1.1 mm or 1.2 mm. The composite ink may be deposited in a wavy pattern where the wave has an amplitude of from 0.25 mm to 1 cm, from 0.5 mm to 10 mm, or 1 mm to 5 mm. The wave of the wavy pattern may have a half wavelength of 0.25 mm to 1 cm, from 0.5 mm to 10 mm, 1 mm to 5 mm, 2 mm, 3 mm, 4 mm, 5 mm, 6 mm, 7 mm, 8 mm, 9 mm, or 1 cm.

It is understood that the descriptions outlining and teaching the printed stretchable strain sensor previously discussed, which can be used in any combination, apply equally well to the second embodiment of the invention, where applicable, further disclosing a method of printing a stretchable strain sensor.

Mixing the nanowire and the metal flake together to form the composite ink may be performed under heat with magnetic stirring. In some embodiments, the mixing temperature may be from about 50° C. to about 100° C., from about 60° C. to about 90° C., from about 50° C. to about 75° C., about 50° C., about 60° C., about 70° C., about 80° C., or about 90° C. The mixing or stirring rate may be about 300 rpm to about 600 rpm, about 300 rpm to about 500 rpm, about 300 rpm to about 400 rpm, about 300 rpm, about 400 rpm, about 500 rpm, about 600 rpm, about 700 rpm, about 800 rpm, about 900 rpm, or about 1,000 rpm.

Depositing the composite ink may be performed at a variety of temperatures using a variety of printing methodologies. For example, in some embodiments, a screen printing process may be used to transfer and couple the composite ink to the stretchable substrate. The screen printing process may use a stencil and/or a mesh to couple the composite ink. The screen printing may be performed at room temperature, from about 20° C. to about 85° C., from about 20° C. to about 60° C., or from about 20° C. to about 25° C.

Curing the composite ink to form a strain-sensitive conductive structure may be performed thermally. Thermally curing the composite ink may be performed from about 100° C. to about 250° C., from about 100° C. to about 200° C., or from about 100° C. to about 150° C.

The strain-sensitive conductive structure may have a thickness from about 10 μm to about 50 μm, from about 15 μm to about 30 μm, or from about 15 μm to about 25 μm as determined by a vertical scanning interferometer microscope.

Figure 2:
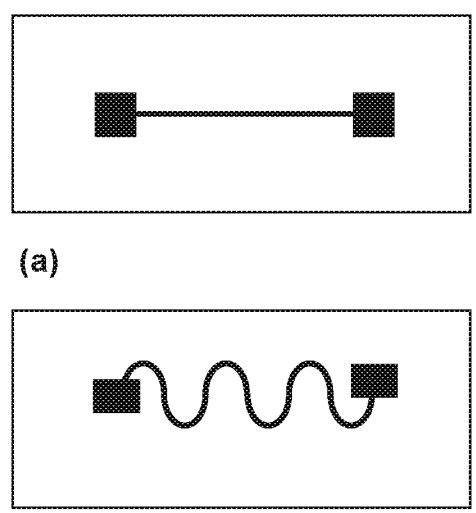
FIG. 2 is a screen printed straight line configuration and wavy line configuration based on strain sensors on flexible and stretchable TPU substrate.

Referring to FIG. 1, a schematic of the straight line strain-sensitive conductive structure (a) and the wavy line strain-sensitive conductive structure (b) is shown. Both the straight line and wavy line configurations are printed having a 4 mm×28 mm dimension. Both the dimensions and the configurations of these strain-sensitive conductive structures may be varied and are not meant to be limiting. FIG. 2 represents the screen printed straight line and wavy line configurations on the stretchable substrate.

Figure 3:
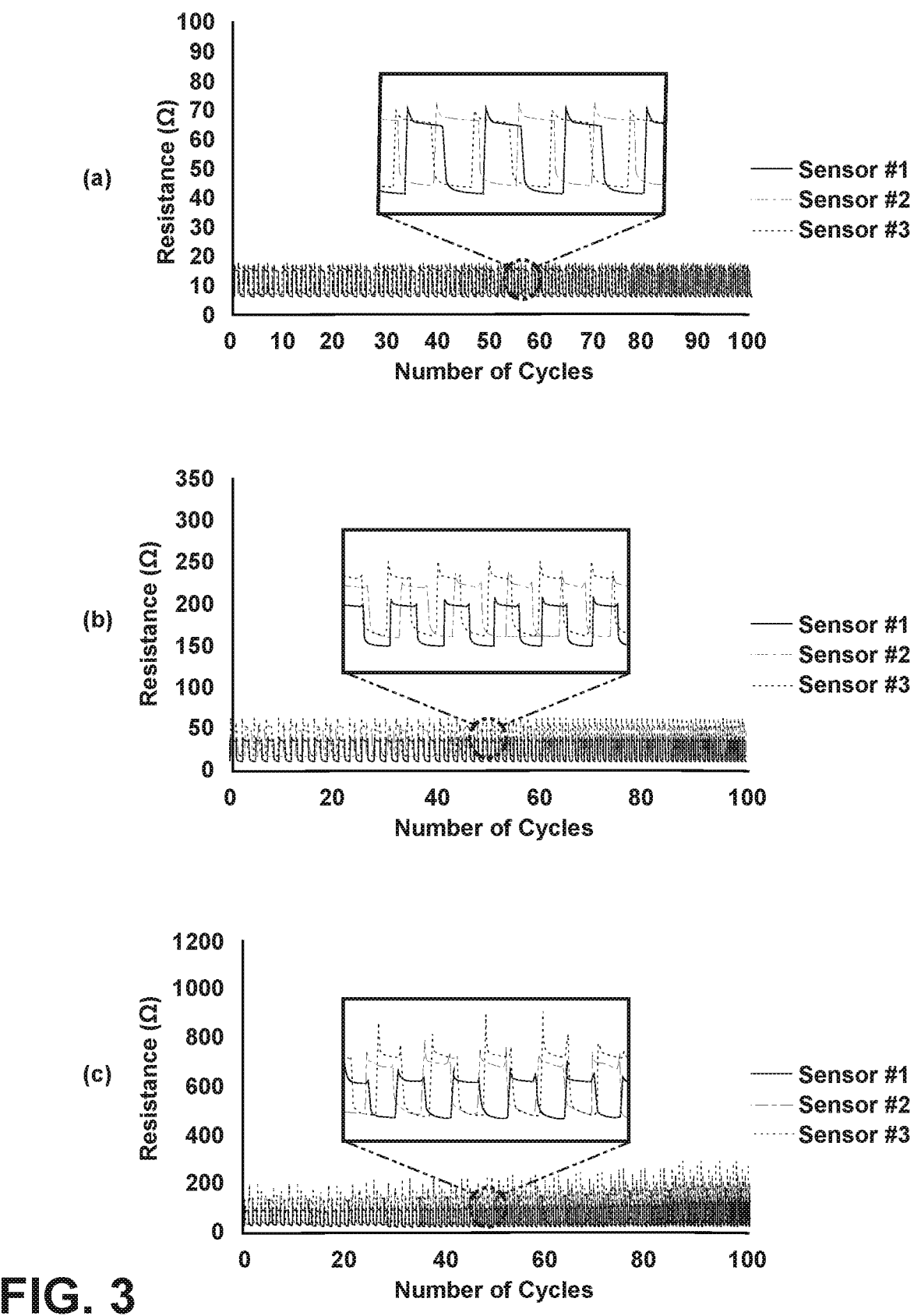
FIG. 3 is an electro-mechanical response of a printed strain sensor with a straight line configuration when subject to cyclic stretch-release test for elongations of 1 mm, 2 mm and 3 mm; at 3 Hz for 100 cycles.

Referring now to FIG. 3, the electro-mechanical response of three different printed strain sensors having a straight line configuration is represented showing the response of the printed strain sensor during the stretch-release cyclic elongation test, for 1 mm (FIG. 3(*a*)), 2 mm (FIG. 3(*b*)), and 3 mm (FIG. 3(*c*)). The average resistance, over 100 cycles, changed from 7.48±0.56Ω to 15.34±0.37 Ω, 17.14±3.70Ω to 47.53±8.52Ω, and 38.44±5.41Ω to 130.30±22.80Ω for the 1 mm, 2 mm, and 3 mm elongations, respectively. A drift in the base-line resistance was observed after the sensor was subject to every 100 cycles of stretch-release tests. This can be attributed to the fact that the sensor was getting fatigued, a phenomenon demonstrated in several research studies.

Figure 4:
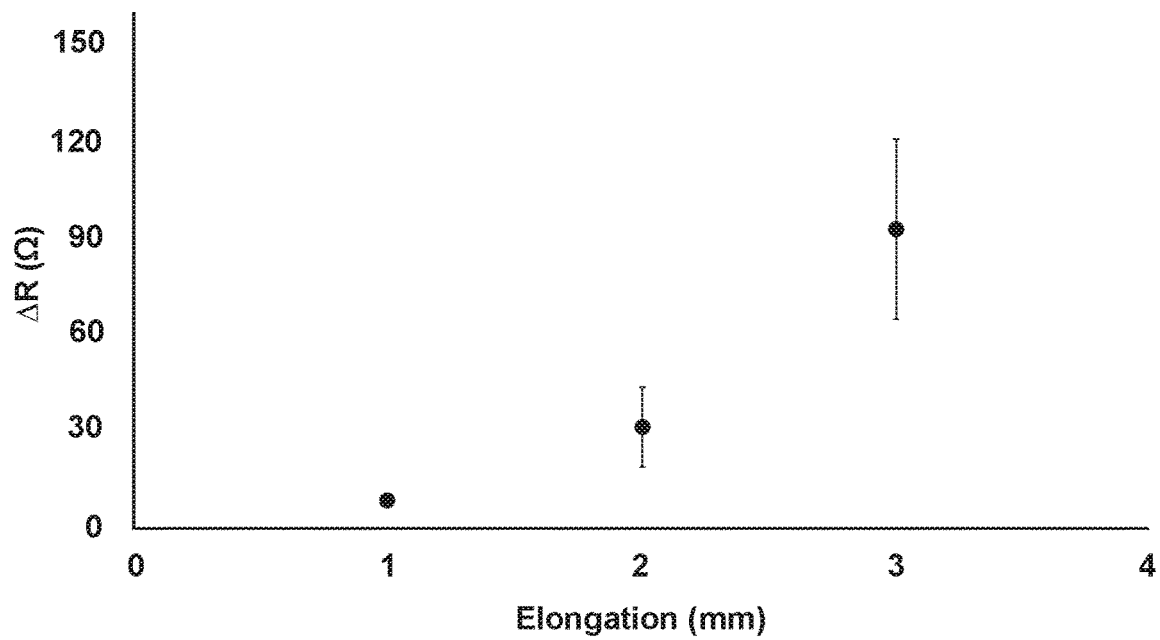
FIG. 4 is a graph showing an average change in resistance of a printed strain sensor with a straight line configuration for elongations of 1 mm, 2 mm, and 3 mm; at 3 Hz for 100 cycles.

Referring now to FIG. 4, the average change in resistance for the 1 mm, 2 mm, and 3 mm elongations was calculated to be 7.86±0.93 Ω, 30.39±12.20Ω, and 91.86±28.20Ω for the printer strain sensors having a straight line configuration, respectively. The strain on the straight and wavy sensors and average percentage changes in resistance were mathematically calculated using Eq. (1) and Eq. (2), respectively.

$$\frac{\Delta R}{R_0}\% = \left(\frac{R_1 - R_0}{R_0}\right) \times 100\% \quad (1)$$

$$\varepsilon\% = \frac{\Delta L}{L_0} = \frac{(L_1 - L_0)}{L_0} \times 100\% \quad (2)$$

where, $R_0$ is the average base resistance, $R_1$ is the average value of the resistance after stretching the sensor over 100 cycles, $L_0$ is the initial length of the strain sensor and $L_1$ is the final length of the strain sensor after stretching.

Figure 5:
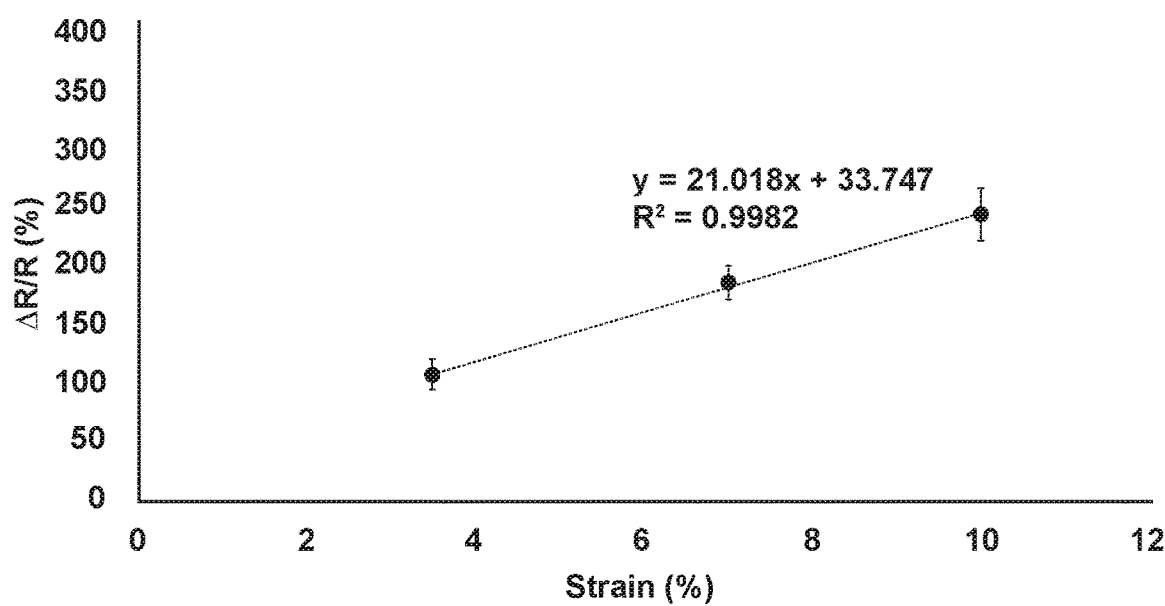
FIG. 5 is a graph showing the effect of strain applied on a printed strain sensor with a straight line configuration.

Referring now to FIG. 5, the experimental results correspond to a 104.88%, 177.30%, and 238.97% average change of the resistance in response to 3.5%, 7%, and 10% strains for the printed strain sensors having a straight configuration, respectively. The slope of the fitted line corresponds to a sensitivity of 21.02% resistance change for every 1% strain, with a correlation coefficient of 0.9982.

Figure 6:
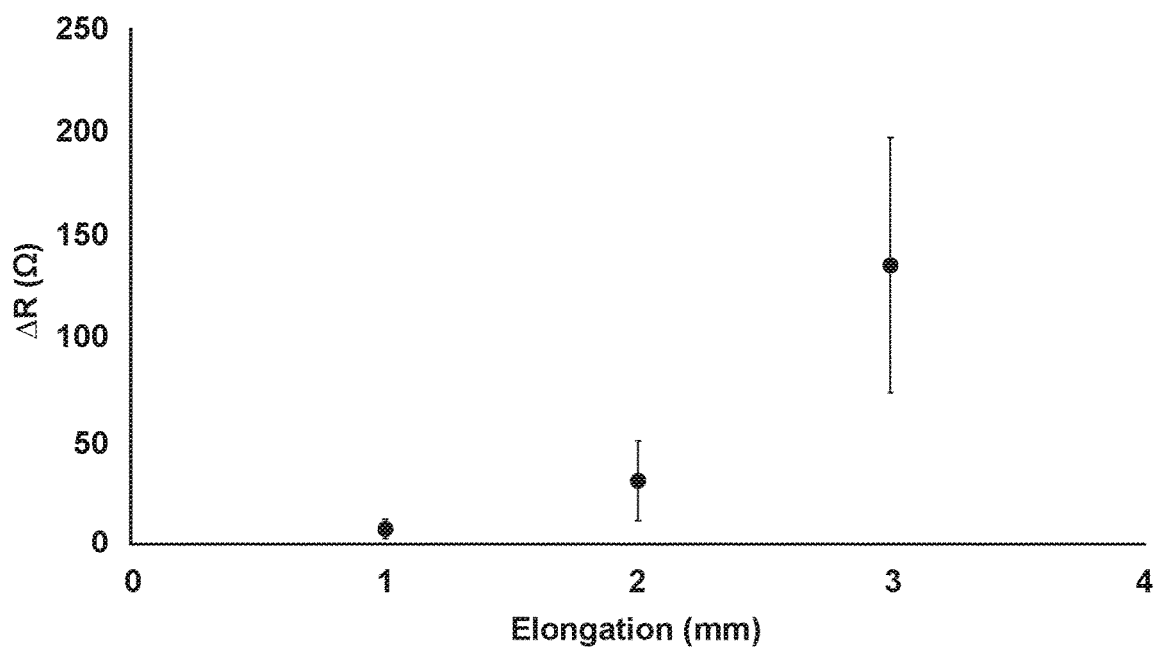
FIG. 6 is a graph showing an average change in resistance of a printed strain sensor with a wavy line configuration for elongations of 1 mm, 2 mm, 3 mm; at 3 Hz for 100 cycles.
Figure 7:
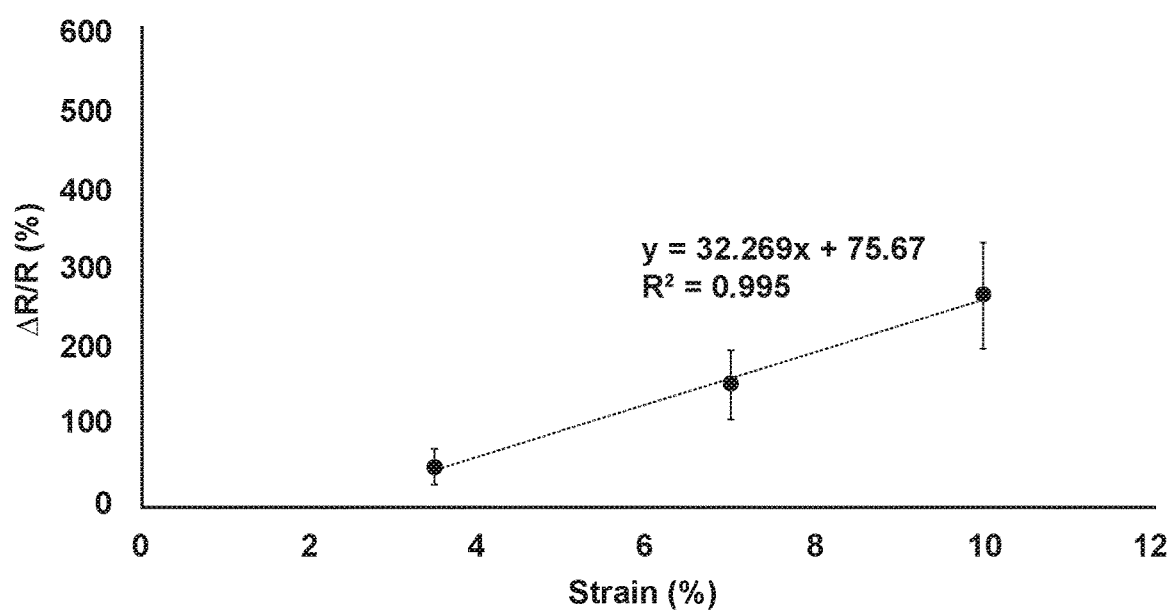
FIG. 7 is a graph showing an effect of strain applied on printed strain sensor with a wavy line configuration.

Referring now to FIGS. 6-7, cyclic stretch-release tests were performed on the printed strain sensor with the wavy line configuration, for 1 mm, 2 mm, and 3 mm elongations. It was observed that the average resistance, over 200 cycles, changed from 13.99±2.56Ω to 20.54±2.06 Ω, 21.21±6.78Ω to 51.22±12.52Ω, and 55.41±17.72Ω to 190.43±44.10Ω for the 1 mm, 2 mm, and 3 mm elongations, respectively. A base-line drift in resistance, similar to that of the sensor with the straight line configuration, was observed for this sensor as well after every 200 cycles of stretch-release tests, due to the effect of sensor fatigue. The increase in number of cycles is because of the capability of the wavy design to perform better, in terms of stretchability while maintaining conductivity, when compared to the sensor with a straight line configuration. The average change in resistance for the 1 mm, 2 mm, and 3 mm elongations was calculated to be 6.55±4.62Ω, 30.01±19.30Ω, and 135.02±61.82Ω, respectively (FIG. 6). These results correspond to an average change of 46.80%, 141.42%, and 243.66%, for a strain of 3.5%, 7%, and 10%, respectively on the printed strain sensor (FIG. 7). For the strain sensor with the wavy line configuration, a higher sensitivity of 33.27% resistance change for every 1% strain is observed, with a correlation coefficient of 0.995.

Figure 8:
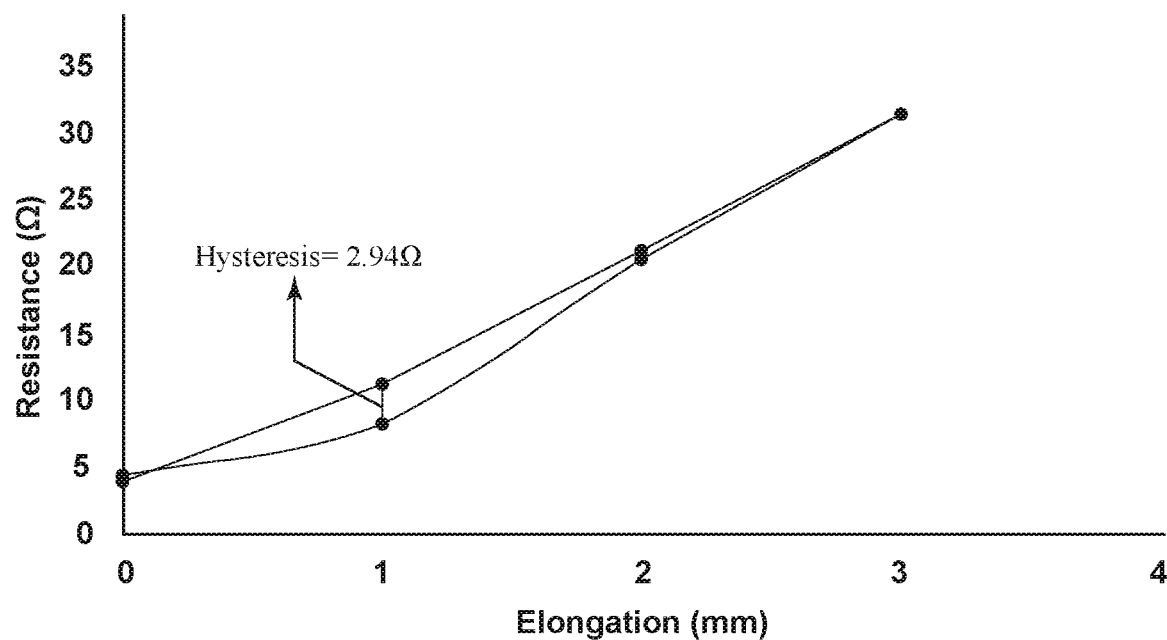
FIG. 8 is a graph showing a hysteresis curve for a printed strain sensor with a straight configuration for elongations of 1 mm, 2 mm, and 3 mm.
Figure 9:
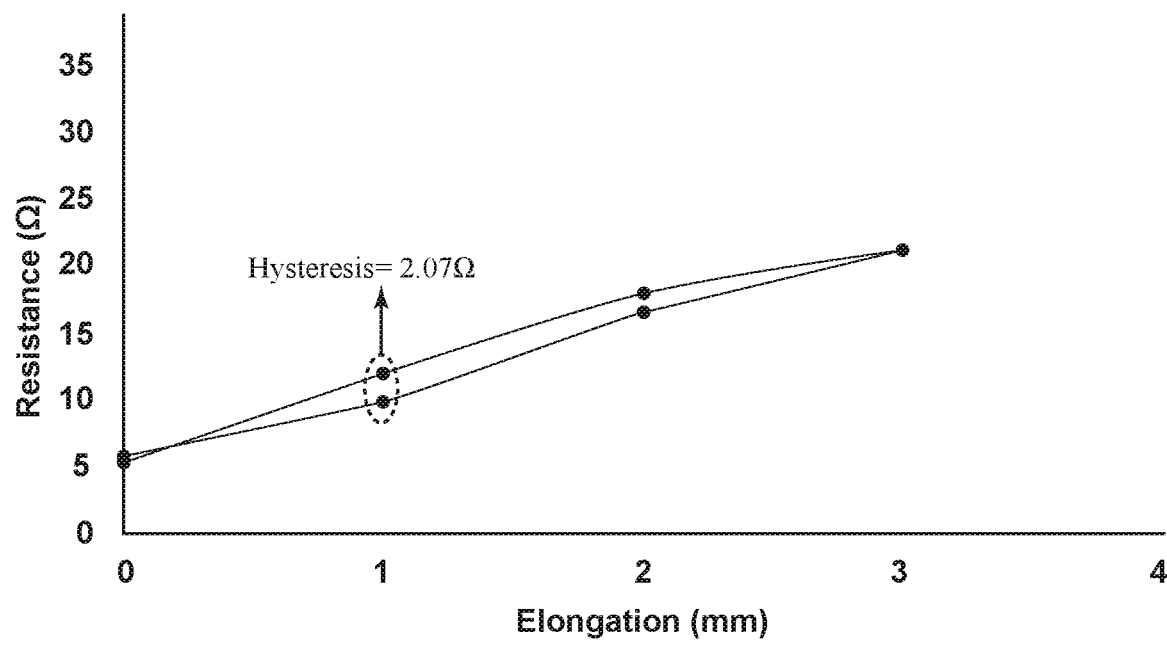
FIG. 9 is a graph showing a hysteresis curve for a printed strain sensor with a wavy line configuration for elongations of 1 mm, 2 mm, and 3 mm.

Referring now to FIGS. 8-9, the hysteresis curves of the printed strain sensors for increasing and decreasing elongations of 1 mm, 2 mm, and 3 mm are plotted. A maximum hysteresis of 2.94Ω and 2.07Ω was observed at 1 mm for the sensors with the straight line (FIG. 8) and wavy line (FIG. 9) configurations, respectively. The results obtained from the electro-mechanical responses of the printed sensors demonstrate that the sensor with the wavy line configuration is suited for strain monitoring applications since the change in resistance was greater when compared to that of the sensor with the straight line configuration. It can also be concluded that the sensor with the wavy line configuration can be implemented for applications that require a stretchable form factor.

EXAMPLES

Chemicals and Materials

Flexible and stretchable TPU (ST604) from Bemis Associates, Inc, was used as a substrate for the fabrication of the strain sensor. The metal-metal composite was prepared using Ag NWs (Blue Nano SLV-NW-90, 1.25% AgNW and 98.75% ethanol), with 25 μm length and 90 nm diameter, and Ag flake ink (Electrodag 479SS, 74.6% Ag, and 25.4% carbitol acetate) from Henkel.

Design of Strain Sensor

Schematics of the strain sensors are shown in FIG. 1. Standard straight line and wavy line configurations were chosen as the designs, to investigate the effect of structural changes on the electro-mechanical response of the sensor. The straight line (FIG. 1 (a)) has a width of 0.8 mm with an overall dimension of 28 mm×4 mm. For wavy lines, it has been reported that a smaller ratio of width to radius of the wavy line segments (w/r), result in more stretchability due to reduced stress on the sensor as well as reduced resistance change. The parameters for the wavy line were thus chosen with an aim of maintaining a smaller w/r ratio and with similar overall dimensions as that of the straight line, for comparison purposes. The wavy line (FIG. 1(b)), which is formed with two half circles connected to each other, was designed with a width of 0.8 mm, radius of 2 mm and overall dimension of 28 mm×4 mm which results in a w/r ratio of 0.4.

Fabrication of Strain Sensor 0.4 g of Ag NWs was mixed with 5 g of the Ag flake ink by magnetically stirring it on a hot plate (VWR Professional series 7×7), at 400 rpm speed and at 70° C. for 30 minutes. This results in a composite of 0.13% Ag NW in Ag flake ink. The prepared Ag NW/Ag flake composite ink was then screen printed at room temperature using a screen printer (AMI MSP 485) from Affiliated Manufacturers Inc. on the flexible TPU substrate. A stainless steel screen from MICROSCREEN® with 325 mesh count and 12.7 μm thick MS-22 emulsion was used. The printed sample was then thermally cured in a VWR 1320 oven for 30 minutes at 120° C. to obtain the strain sensor (FIG. 2). The 3D profilometry images of the printed samples measured using a Bruker vertical scanning interferometer microscope (CounterGT) gave an average thickness of 18.18 μm and 19.82 μm for the straight and wavy lines, respectively.

Experiment Setup

The strain sensor (printed straight/wavy lines) was placed in between the clamps of a force gauge (Mark-10 ESM 301 motorized test stand), with a vertically movable platform. The platform, capable of moving upwards and downwards, was used to apply the varying elongations of 1 mm, 2 mm, and 3 mm. Ag conductive epoxy paste (CIRCUITWORKS® CW2400) was used to bond connecting wires to the contact pads of the printed lines. The wires were then connected to an Agilent E4980A precision LCR meter using alligator clips. A cyclic elongation test was performed on the sensor, at 3 Hz operating frequency. The electro-mechanical based response of the strain sensor was acquired using a custom built LABVIEW™ program installed on a computer. The resistance change of the printed sensors was recorded during each stretch-release cycle and the dynamic range was determined for each sensor.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

Listing of Non-Limiting Embodiments

Embodiment A is a printed stretchable strain sensor comprising: a stretchable substrate; and a composite ink coupled to a surface of the stretchable substrate to form a strain-sensitive conductive structure; wherein the composite ink comprises a nanowire and a metal flake.

The sensor of Embodiment A wherein the nanowire comprises silver nanowire, gold nanowire, copper nanowire, nickel nanowire, carbon nanowire, platinum nanowire, aluminum nanowire, or combinations thereof.

The sensor of Embodiment A or Embodiment A with any of the intervening features wherein the metal flake comprises silver flake, gold flake, copper flake, nickel flake, platinum flake, aluminum flake, or combinations thereof.

The sensor of Embodiment A or Embodiment A with any of the intervening features wherein the nanowire in the metal flake has a weight percent from 0.1% to 10.0%.

The sensor of Embodiment A or Embodiment A with any of the intervening features wherein the printed stretchable strain sensor has a maximum strain of up to 50%.

The sensor of Embodiment A or Embodiment A with any of the intervening features wherein the stretchable substrate comprises silicone, polyurethane, polybutadiene, neoprene, polydimethylsiloxane, silicone rubbers, or combinations thereof.

The sensor of Embodiment A or Embodiment A with any of the intervening features wherein the composite ink coupled to the surface of the stretchable substrate to form the strain-sensitive conductive structure is a straight line configuration.

The sensor of Embodiment A or Embodiment A with any of the intervening features wherein the straight line configuration has a sensitivity of about 20.0% to 25.0% in resistance change for a 1% strain.

The sensor of Embodiment A or Embodiment A with any of the intervening features wherein the composite ink coupled to the surface of the stretchable substrate to form the strain-sensitive conductive structure is a wavy line configuration.

The sensor of Embodiment A or Embodiment A with any of the intervening features wherein the wavy line configuration has a sensitivity of about 30.0% to 35.0% in resistance change for a 1% strain.

Embodiment B is a method of printing a stretchable strain sensor, the method comprising: mixing a nanowire together with a metal flake to form a composite ink; depositing the composite ink in a predetermined continuous configuration onto a surface of a stretchable substrate; and curing the composite ink to form a strain-sensitive conductive structure.

The method of Embodiment B wherein the nanowire comprises silver nanowire, gold nanowire, copper nanowire, nickel nanowire, carbon nanowire, platinum nanowire, aluminum nanowire, or combinations thereof.

The method of Embodiment B or Embodiment B with any of the intervening features wherein the metal flake comprises silver flake, gold flake, copper flake, nickel flake, platinum flake, aluminum flake, or combinations thereof.

The method of Embodiment B or Embodiment B with any of the intervening features wherein the nanowire in the metal flake has a weight percent from 0.1% to 10.0%.

The method of Embodiment B or Embodiment B with any of the intervening features wherein the printed stretchable strain sensor has a maximum strain of up to 50%.

The method of Embodiment B or Embodiment B with any of the intervening features wherein the stretchable substrate comprises silicone, polyurethane, polybutadiene, neoprene, polydimethylsiloxane, silicone rubbers, or combinations thereof.

The method of Embodiment B or Embodiment B with any of the intervening features wherein the composite ink coupled to the surface of the stretchable substrate to form the strain-sensitive conductive structure is a straight line configuration.

The method of Embodiment B or Embodiment B with any of the intervening features wherein the straight line configuration has a sensitivity of about 20.0% to 25.0% in resistance change for a 1% strain.

The method of Embodiment B or Embodiment B with any of the intervening features wherein the composite ink coupled to the surface of the stretchable substrate to form the strain-sensitive conductive structure is a wavy line configuration.

The method of Embodiment B or Embodiment B with any of the intervening features wherein the wavy line configuration has a sensitivity of about 30.0% to 35.0% in resistance change for a 1% strain.

The invention claimed is:

1. A printed stretchable strain sensor comprising:
   a stretchable substrate; and
   a composite ink coupled to a surface of the stretchable substrate to form a strain-sensitive conductive structure;
   wherein the composite ink comprises a nanowire and a metal flake,
   wherein the nanowire is present in the metal flake at a nanowire weight percent of from about 0.1% to about 10.0%, and
   wherein the composite ink is substantially free of triblock copolymeric materials.

2. The printed stretchable strain sensor of claim 1, wherein the nanowire comprises silver nanowire, gold nanowire, copper nanowire, nickel nanowire, carbon nanowire, platinum nanowire, aluminum nanowire, or combinations thereof.

3. The printed stretchable strain sensor of claim 1, wherein the metal flake comprises silver flake, gold flake, copper flake, nickel flake, platinum flake, aluminum flake, or combinations thereof.

4. The printed stretchable strain sensor of claim 1, wherein the printed stretchable strain sensor has a maximum strain of up to 50%.

5. The printed stretchable strain sensor of claim 1, wherein the stretchable substrate comprises silicone, polyurethane, polybutadiene, neoprene, polydimethylsiloxane, silicone rubbers, or combinations thereof.

6. The printed stretchable strain sensor of claim 1, wherein the composite ink coupled to the surface of the stretchable substrate to form the strain-sensitive conductive structure is a straight line configuration.

7. The printed stretchable strain sensor of claim 6, wherein the straight line configuration has a sensitivity of about 20.0% to 25.0% in resistance change for every 1% strain.

8. The printed stretchable strain sensor of claim 1, wherein the composite ink coupled to the surface of the stretchable substrate to form the strain-sensitive conductive structure is a wavy line configuration.

9. The printed stretchable strain sensor of claim 8, wherein the wavy line configuration has a sensitivity of about 30.0% to 35.0% in resistance change for every 1% strain.

10. A method of printing a stretchable strain sensor, the method comprising:
   mixing a nanowire together with a metal flake to form a composite ink, wherein the nanowire is present in the metal flake at a nanowire weight percent of from about 0.1% to about 10.0%, and wherein the composite ink is substantially free of triblock copolymeric materials;
   depositing the composite ink in a predetermined continuous configuration onto a surface of a stretchable substrate; and
   curing the composite ink to form a strain-sensitive conductive structure.

11. The method of claim 10, wherein the nanowire comprises silver nanowire, gold nanowire, copper nanowire, nickel nanowire, carbon nanowire, platinum nanowire, aluminum nanowire, or combinations thereof.

12. The method of claim 10, wherein the metal flake comprises silver flake, gold flake, copper flake, nickel flake, platinum flake, aluminum flake, or combinations thereof.

13. The method of claim 10, wherein the printed stretchable strain sensor has a maximum strain of up to 50%.

14. The method of claim 10, wherein the stretchable substrate comprises silicone, polyurethane, polybutadiene, neoprene, polydimethylsiloxane, silicone rubbers, or combinations thereof.

15. The method of claim 10, wherein the composite ink coupled to the surface of the stretchable substrate to form the strain-sensitive conductive structure is a straight line configuration.

16. The method of claim 15, wherein the straight line configuration has a sensitivity of about 20.0% to 25.0% in resistance change for every 1% strain.

17. The method of claim 10, wherein the composite ink coupled to the surface of the stretchable substrate to form the strain-sensitive conductive structure is a wavy line configuration.

18. The method of claim 17, wherein the wavy line configuration has a sensitivity of about 30.0% to 35.0% in resistance change for every 1% strain.

19. The printed stretchable strain sensor of claim 1, wherein the nanowire present in the metal flake is selected from:
   silver nanowire present in silver metal flake;
   gold nanowire present in gold metal flake;
   copper nanowire present in copper metal flake;
   nickel nanowire present in nickel metal flake;
   platinum nanowire present in platinum metal flake; and
   aluminum nanowire present in aluminum metal flake.

20. The method of claim 10, wherein the mixing a nanowire together with a metal flake comprises one of:
   mixing a silver nanowire together with a silver metal flake;
   mixing a gold nanowire together with a gold metal flake;
   mixing a copper nanowire together with a copper metal flake;
   mixing a nickel nanowire together with a nickel metal flake;
   mixing a platinum nanowire together with a platinum metal flake; and
   mixing an aluminum nanowire together with an aluminum metal flake.

\* \* \* \* \*